INVENTOR.
ROBERT G. RUSSELL
BY
ATTORNEYS

May 2, 1961 R. G. RUSSELL 2,981,999
APPARATUS AND METHOD FOR FORMING POROUS
FIBROUS SHEET MATERIAL
Filed July 9, 1956 4 Sheets-Sheet 3
Fig. 3
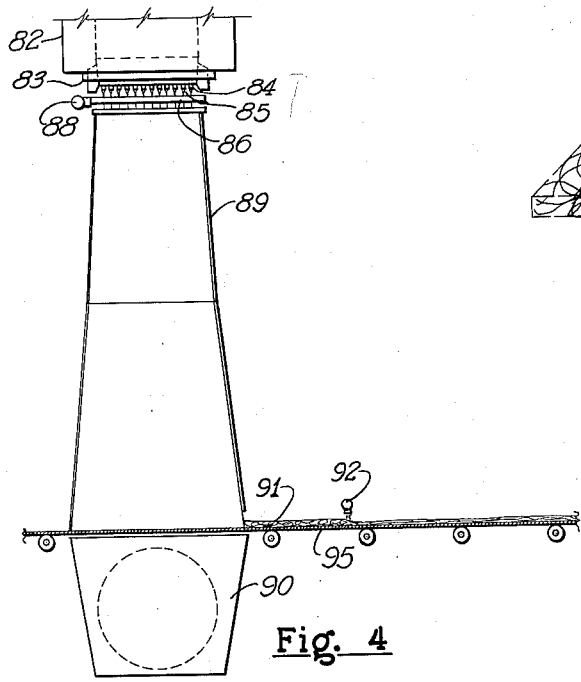
Fig. 4
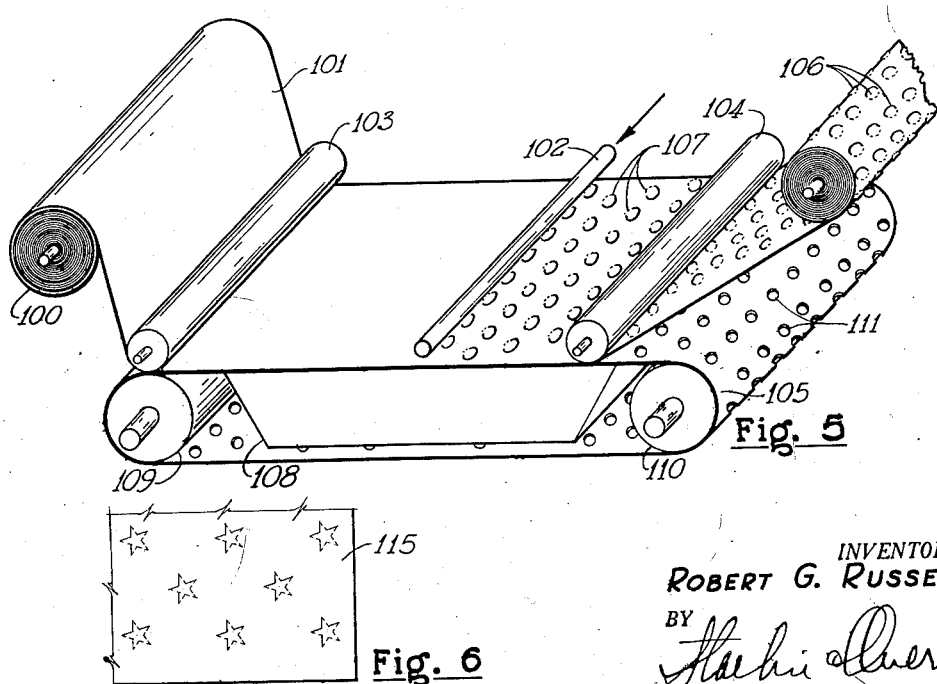
Fig. 5
Fig. 6
INVENTOR.
ROBERT G. RUSSELL
BY
ATTORNEYS

INVENTOR.
ROBERT G. RUSSELL
BY
ATTORNEYS

United States Patent Office 2,981,999
Patented May 2, 1961

2,981,999

APPARATUS AND METHOD FOR FORMING POROUS FIBROUS SHEET MATERIAL

Robert G. Russell, Granville, Ohio, assignor to Owens-Corning Fiberglas Corporation, a corporation of Delaware Filed July 9, 1956, Ser. No. 596,490

11 Claims. (Cl. 28—1)

This invention relates to a method and apparatus for producing a new type of nonwoven sheet material or mat and more particularly to nonwoven sheets or mats made of fibrous glass.

It is conventional practice to incorporate in nonwoven sheets or mats made of fibrous matter, a bonding agent to effect joinder of the fibers into an integrated mass. The binder material incorporated in the product usually bonds the fibers at their points of intersection and thereby causes it to acquire a dimensionally stable form. Binder materials have heretofore been considered quite necessary in the manufacture of nonwoven fabrics or mats, especially when the product is made of material such as glass fibers and filaments which characteristically have smooth nonprojecting or nontenacled surfaces which do not lend themselves to establishment of a clinging or grasping interconnecting relationship.

Bonding materials in many instances, however, are undesirable because of their possible incompatibility with material subsequently to be incorporated with products to be produced. For example, because of the great strength of glass fibers they are frequently utilized in the manufacture of mats and fabrics which are subsequently incorporated in products such as articles molded or resinous material, as well as other materials, both organic and inorganic, including materials such as metal. The strength of glass fibers in such instances is extremely valuable in imparting strength as reinforcement to a basic matrix material. Frequently the material to be so reinforced will not wet out the fabric or mat when certain binder materials are incorporated therein, or when a percentage of binder material is incorporated therein beyond a certain limit. Still further, binding materials incorporated in glass fabrics or mats are often not compatible with the material thus to be reinforced, and accordingly it would frequently be desirable if the mat or fabric would have an inherent integrity of its own which would do away with the need for a binding agent altogether.

Accordingly, it is an object of this invention to provide a new method and means for producing a mat or fabric of fibrous material which will do away with the need for binder material to impart the desired integrity to the product.

Another object of the invention is to provide a method and means for manufacture or production of mats and fabrics of fibrous material without a binding agent incorporated therein, and in the process of production, to treat the basic material of the product to make it more readily adaptable to subsequent processing.

It is still another object of the present invention to provide a method for producing a new fibrous glass mat or fabric of nonwoven character which is adaptable to manufacture on conventional production equipment.

In brief, the invention is related to the production of binderless mats or nonwoven fabrics by accumulating material in fibrous form as a mass and then subjecting such mass to gaseous blasts to cause an interengaging relationship or interlocking association of portions of fibers thereof to provide the integrity desired. In other words, a layer of fibers either discontinuous or continuous when subjected to the forces of gaseous blasts directed immediately thereagainst according to this invention causes fibers to inter-engage each other at the exposed surface of the layer as well as extend from the surface of the layer to internal parts of the mat, thereby causing the fibers themselves to act as interlocking bonding elements.

Other objects and features which I believe to be characteristic of my invention are set forth with particularity in the appended claims. My invention, however, both in organization and manner of construction together with further objects and advantages thereof may be best understood by reference to the following description taken in connection with the accompanying drawings, in which:

Figure 3 is an illustration representative of a section of mat of continuous fiber strands made according to the present invention;

Figure 4 is a side elevational view of another arrangement of apparatus for forming mats according to the present invention;

Figure 5 is a perspective view of a process for subjecting mats to treatment for embossed designs according to the present invention;

Figure 6 is a top plan view of a conveyor belt with apertured designs capable of being impressed in embossed form on mats treated according to this invention.

Although the mats made according to this invention are capable of being produced from any of a variety of materials including resinous and mineral materials, their production is herein described in relation to formation of fibers of materials such as glass because of its adaptability to production at extremely high rates of speed.

Figure 1:
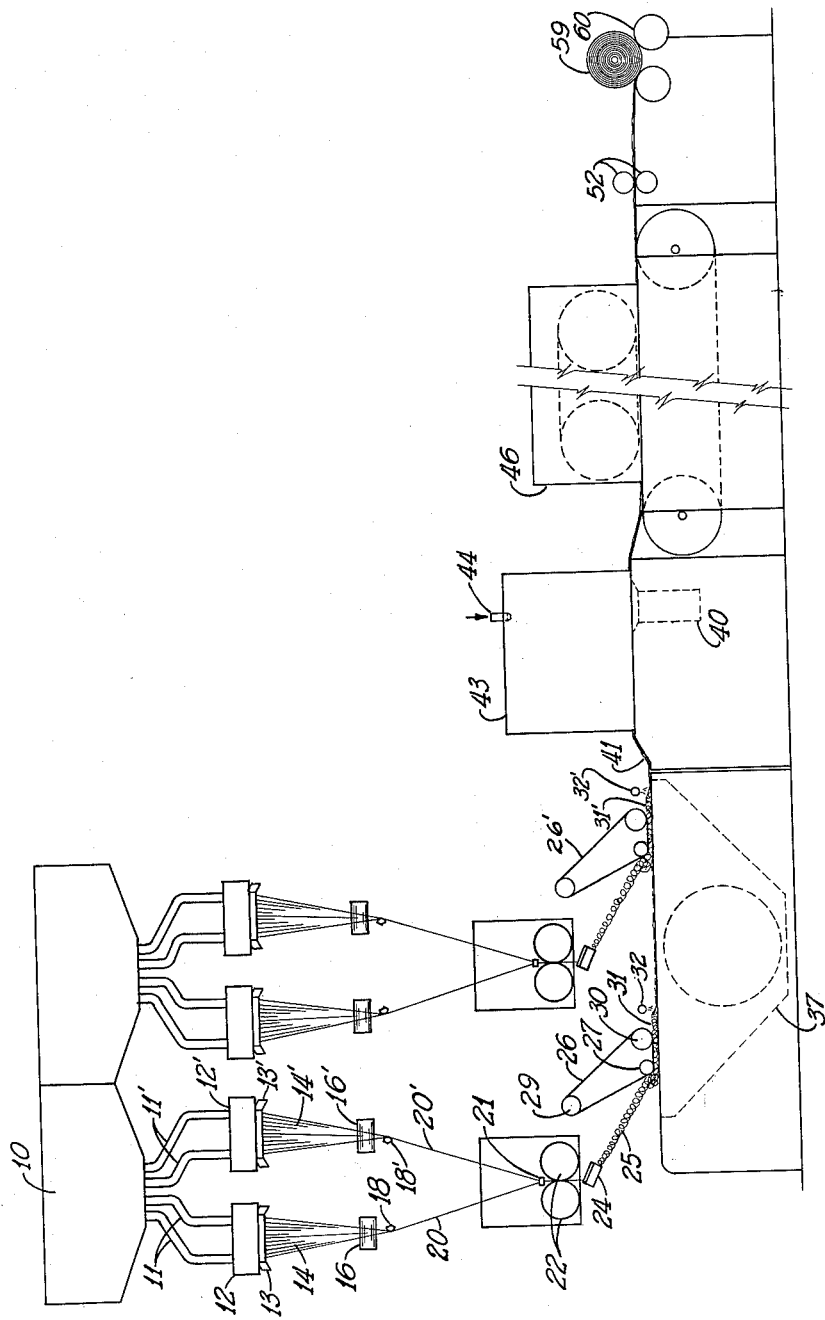
Figure 1 is a partially schematic side elevational view of a production line with two forming stages for manufacture of fibrous mats according to the present invention.

Turning to the drawings in greater detail wherein identical reference numerals are used in referring to similar parts, Figure 1 shows a complete production line for the manufacture of continuous strand mats including two similar stages of strand and mat formation which are arranged in tandem relationship along the length of the line. The two stages of formation comprise a first stage which deposits a bottom strand layer 31 on the conveyor while the second stage deposits a top layer 31' thereover to make up a mat product.

When the material of which the mats are made is glass, as herein described, it may be initially in the form of marbles supplied from a common source 10 through supply chutes 11. From the chutes the marbles are introduced into the melting units of both stages of fiber formation. The melting apparatus in each stage consists of a pair of electrical melting units 12 and 12' and associated feeders 13 and 13', respectively. The glass is attenuated into filaments 14 and 14' from the feeders 13 and 13', respectively. Each group of filaments 14 is drawn over a roll-type sizing applicator 16 and 16' before being gathered into the form of strands 20 and 20' over gathering members 18 and 18', respectively.

The sizing material applied to the filaments may merely be water to provide the lubricity required at the gathering members 18 and 18'. Such sizing material later evaporates or can be dried leaving only the bare glass filaments in the strand. A sizing fluid is frequently desirable, however, which will leave a coating on the strand to promote integrity in the strand as well as to promote compatibility with other materials in further production operations. For example, it might be desirable to incorporate a sizing fluid in the strand which will promote wetting of the mat by a resin which the mat is to reinforce in a final product.

Figure 2:
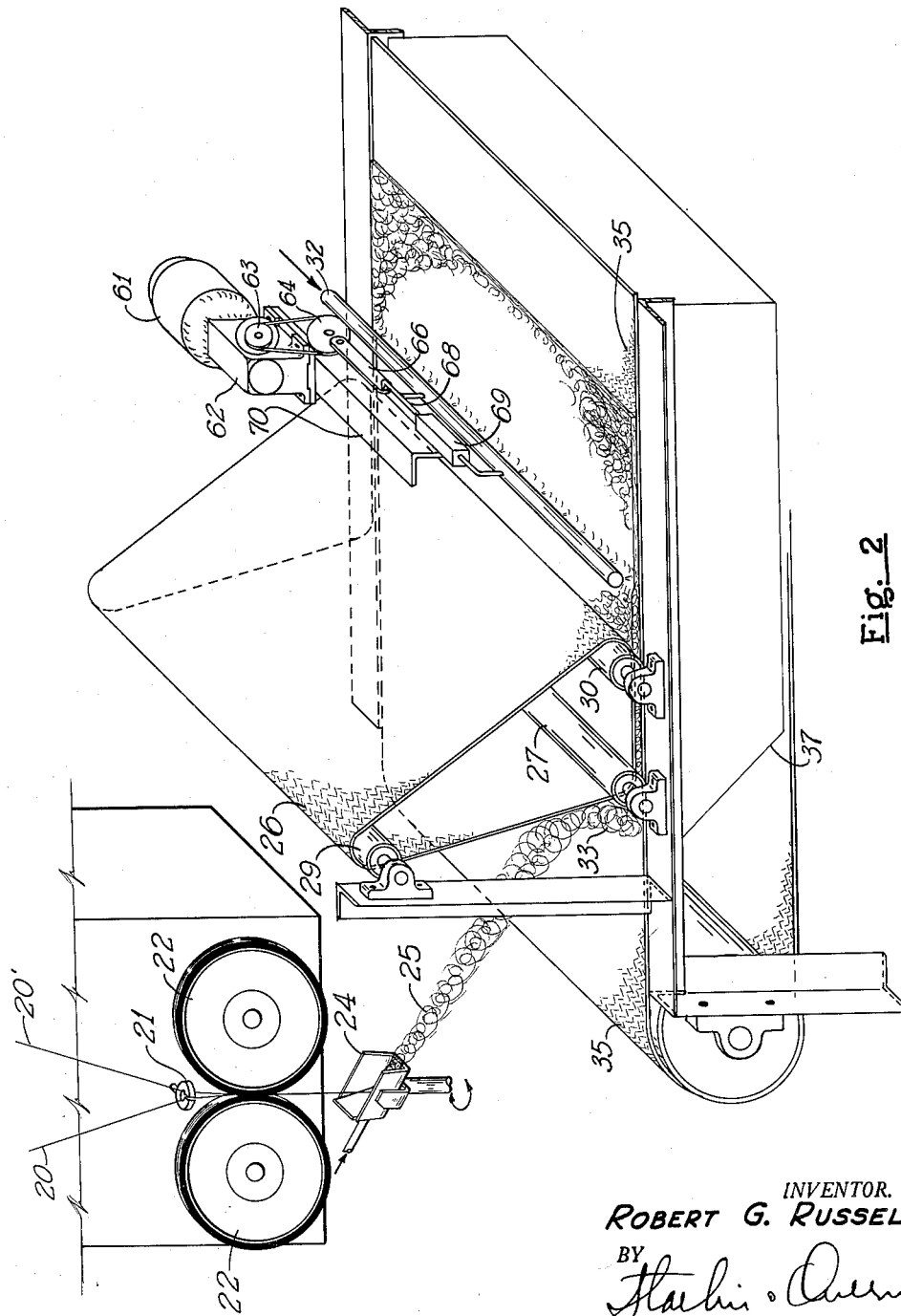
Figure 2 is an enlarged view in perspective of a single forming stage of the type incorporated in the production line of Figure 1.

As may be seen more clearly in Figure 2, the strands 20 and 20' are drawn through a guide eye 21 by a single pair of mated pulling wheels 22. The strands are pulled in the same general direction in spaced relation and are imparted sufficient kinetic energy that when driven against a laterally oscillating deflector unit 24 they are deflected and deposited in intermixed relation as an accumulation 33 on a conveyor belt 35 which extends and passes under an overhanging flight formed of a foraminous mesh-type belt 26 inclined downwardly toward the conveyor 35. If desired, the strands can be arranged to have their filaments dispersed in spaced relationship upon impingement against units 24 to impart a finer or fuzzed texture thereto.

The overhanging flight or belt 26 is driven in the same linear direction as the conveyor 35 to cause a compaction of the accumulation 33 under the flight section beneath the rolls 27 and 30. The overhanging belt 26 is as wide as the conveyor belt 35 on which the strand is deposited and is supported by an upper roll 29 and a pair of forwardly located lower level rolls 27 and 30 spaced from each other and disposed a slight distance above the conveyor. The rolls 27 and 30 are adjustable up and down to permit adjustment for the degree of compaction desired to be exercised on the material deposited on the conveyor.

A suction box 37 extends under each stage of formation of the mat and aids compaction of the strand under the overhanging flight 26. After passage under the overhanging flight, the layers 31 and 31' are each subjected to the forces of pressurized blasts emitted from blowers 32 and 32'. The pressurized blasts emitted from the blowers may be any of a number of gases including air, steam, or treating gases which are compatible with glass fibers or coatings thereof; or gases which are advantageously applicable to glass to promote improved properties.

This causes some of the relatively loose accumulations of mat, even through already somewhat compacted, to inter-engage both at the surfaces and immediately below the surfaces of the mat while other portions are pushed downwardly for a frictional inter-engaging relationship with fiber portions located in the interior of the mat.

Each of the layers of mat 31 and 31' are subjected to the forces of gaseous jets following emission from under the overhanging flights 26 and 26', respectively. After formation of the first layer and subjection thereof to the gaseous blasts of the blower 32, the second layer of strand is deposited thereover and the combination of the already intra-knit accumulation 31 and the overlaying accumulation 31' are passed under the second overhanging flight 26' whereupon the combination is subjected to a second application of gaseous blast forces from a blower 32'. This second application of force by way of gaseous jets causes an inter-engagement of portions of the strands and fibers of the overlying layer 31' within itself as well as with strand and fiber portions of the first layer 31. In another sense, the second stage of application of gaseous blast forces results in an integration of the second layer 31' and an inter-knitting thereof with the already integrated first layer 31 to produce a composite of the two layers which is effectively a single unitary mat. Experience has indicated that the two layers can be integrated in this manner without tendencies in the final product toward separation of the layers.

Although a relatively thick single layer of strand accumulation can be formed into an integral binderless mat-type product, a much thicker integral binderless mat can be produced by joining two layers or more of fibrous strand accumulated on top of each other, each being subjected to integrating forces prior to deposition of another layer thereover. All that is required is that the top-most accumulation is not so thick that the forces of gaseous jets directed thereagainst cannot reach through the entire layer subjected to the forces. That is, the thickness of the top-most layer must be sufficiently thin that the forces of gaseous jets directed thereagainst can extend from the top-most portions of the fibrous layer into the underlayer on which each is deposited.

After being so accumulated and integrated, a strand mat has sufficient integrity and dimensional stability that it may be rolled up for subsequent use or processing into a fabricated product. If desired, however, the mat may be passed through a fog chamber 43 for receipt of materials of special nature adaptable to promotion of further processing according to customer needs. At this stage a small amount of binder material can be optionally incorporated into the mat to effect a stiffening or even a more positive binding of portions of the fibers contacting each other within the mat. Under these circumstances the material to be incorporated in the mat may be injected into the chamber 43 in the form of a fog by way of a supply jet 44 and can be arranged to be drawn through the interior portions of the mat by way of a suction chamber 40 located under the foraminous conveyor 35 in the zone below the fog chamber 43. It is to be understood, however, that this fog chamber treatment is not a necessity in producing the mat according to this invention, but that the production of the binderless mat as described lends itself to subsequent incorporation of materials within the mat for special purposes depending upon subsequent processing or ultimate use of the mat product.

If the mat product is to have matter supplied thereto, such as in the form of a vaporized solution of a resin introduced into the fog chamber 43, it can be subsequently cured within an oven 46, if necessary. Subsequent to passage through the oven 46 the product may be passed between a pair of cooling rolls 52 and then finally rolled into a roll-type package 59 on roll-up apparatus 60 to make the product ready for shipment as well as for further processing or fabrication.

Now having described the apparatus and operation of the production line of Figure 1 generally, the first stage of strand deposition is referred to in Figure 2 for a more detailed description of the method of forming the mat-type product of this invention. It has been found that more than one strand can be drawn in closely spaced relation through a pair of coacting high speed pulling wheels for deflection from a single deflection unit 24 without snagging or otherwise causing a disturbance in continuity of control over the strands in their passage to the collection zone. Each of two strands can be drawn through the pull wheels and imparted sufficient kinetic energy to effect its deflection from the unit 24 at speeds in the order ranging from 2000 feet per minute and up. By being allowed to pull more than one strand through a single pair of pull wheels simultaneously, a mat of the resulting layer of strand deposited on the conveyor for a given speed of pull can be made of finer texture with a greater number of interstices since it can be arranged that strands of fewer number of filaments and correspondingly, strands of lesser diameter and greater yardage per pound, can be incorporated within a given time from a single forming position. Under these conditions a mat layer of given weight has a texture of greater refinement than an equal weight mat of greater diameter strands. In being deflected from the unit 24, the two strands are thrown as an inter-associated mass of continuous strands each of which assumes a somewhat helical or swirled configuration and is thrown forwardly into the strand accumulation 33 in the collection zone.

Upon passage of the accumulation of strand between the overhanging conveyor 26 and the conveyor 35 upon which it is laid, the mass is compressed into a more compacted relationship, but only in a temporary sense since upon release from between the overhanging conveyor, the accumulation expands to a portion of its original thickness.

After release from under the overhanging belt 26, the mass is subjected to the forces of a series of gaseous jets aligned next to each other and issuing from a longitudinal tubular blower 32 extending across the width of the conveyor 35 and over the mass already somewhat compacted. The tube 32 is oscillated in short stroke vibratory manner over the full width of the mass in order to cause each of the jets to extend over a portion of the width of the mat and correspondingly to be more effective in inter-knitting a portion of the width of the layer of material on the conveyor 35. The blower tube 32 is oscillated by a drive motor 61 which drives a pulley 63 and an eccentric drive wheel 64 through a gear train in a gear box 62. A bar 66 connects the eccentric drive wheel 64 with an arm 68 which is slidably mounted for horizontal reciprocation within a bearing block 69 supported from a support channel 70.

The blower tube 32 can be oscillated across the conveyor at any of a variety of frequencies depending on the speed of movement of the conveyor 35 while the gas pressure in the tube 32 may be at any of a number of magnitudes. If the spacing of the jet orifices in the tube 32 is small, the amplitude and rate of the cyclic oscillation need not be as great as that if the spacing were large. By way of example without intention to quantitatively limit the invention, experience has indicated that satisfactory results can be obtained by oscillating jets spaced approximately 5" apart across a 50" width of mat at 300 cycles per minute with a 6" stroke. Correspondingly, if the jets were spaced 1" apart and the stroke is ½", the oscillatory action may be in the range of 60 cycles a minute. Under these conditions, steam at a pressure of 100 to 120 pounds per square inch has been found quite satisfactory in producing the results desired, while air at a pressure of 70 to 100 pounds per square inch is also quite satisfactory. Layers of mat in the range of thickness of from ⅛" to ⅜" can be treated under the above conditions.

For porous mats, the inter-knitting of fiber or filamentous portions incorporated therein can be accomplished readily with lesser pressure behind the gaseous jets than in mats of lesser porosity. Also, under given pressure conditions, the greater the porosity of the mat, the greater is the thickness of mat which can be treated. Correspondingly, the greater the pressure behind the gaseous jets, the greater is the thickness of mats which given jets are capable of treating. The number of layers of mat which may be inter-knitted in this way again is not limited since inter-knitting of layers can be accomplished as long as each new top layer can be operated upon in such manner as to permit inter-knitting of the loops thereof with an immediately underlying layer.

It will also be understood that although a single longitudinal tube mechanism is shown for supply of gaseous jets operating against the upper surfaces of deposited layers of strand, jets may also be directed from under the foraminous conveyor against the bottom-most layer of mat on the conveyor to cause an inter-knitting of the bottom portions of the mat with more interior portions thereof. In other words, when a single layer of mat is to be treated for integration thereof it may be treated from both the upper and lower surfaces to cause the inter-knitting of portions at both major surfaces with interior portions of the mat.

Although a multiplicity of aligned jets in a single row are shown herein as being used to inter-knit fibrous matter, it will be understood that more than one row of jets may be traversed across a fibrous mass to cause its self-integration. Also, a single jet of gas traversed across a fibrous mass with sufficient rapidity will effect such integration. Still further, a plurality of jets in fixed nontraversing disposition over such a mass, or a wide sheet-type jet might be used to effect the desired result. A traversing jet, however, has in most instances been found preferable. The traversing action, it is believed, effects better interlacing of the several strand portions because of its lateral component of force by reason of motion in addition to its downward components. In this respect it is to be noted that the jets directed against the exposed surface of a fibrous mass can be inclined somewhat from the perpendicular to the exposed surface to provide additional lateral components of force against the mass.

Figure 3 illustrates a section of mat 31 indicating in a general manner the way in which strand portions of the mat are inter-knitted or inter-linked to effect a bonded relationship between closely spaced portions thereof to provide the mat integrity desired wtihout need for adhesive bonding material.

Although the invention as thus far described has been described in relation to formation of binderless mats of continuous strands and fibers, it will be understood that the principles of the invention are also applicable to making of binderless mats of masses of discontinuous fibers.

Referring to Figure 4, a source of molten material such as a forehearth 82 of a melting furnace supplies molten glass to a feeder 83 having orificed tips 84 associated therewith from which streams of glass 85 are emitted. The glass emitted from the feeder orifices are subjected to forces of blasts of gas such as steam or air from a gaseous blower 86. The blower 86 is connected to a header 88 from which the gas such as steam or air under pressure is supplied to the blower. Glass when subjected to the forces of such gas are effective in disrupting the material of the streams into discontinuous fibers which are then introduced into a hood 89 disposed below. The hood provides a means for channelling the fibers to a conveyor 95 located thereunder. The conveyor 95 is a foraminous belt of chain mesh-type and has a suction chamber 90 located under the collection zone within the hood 89.

Gases and fibers within the hood are drawn downwardly toward the collection surface by reason of the reduced atmospheric pressure in the region at the lower end of the hood. Fibers collected within the hood are carried forwardly on the conveyor belt 95 as a mass 91. In being carried forward, the mass 91 is conveyed under a gaseous blast source 92 from which blasts or jets of gas are ejected across the width of the conveyor and operate on the surface of the mat in the same manner as the jets emitted from the tube 32 to cause an inter-entangling of the fibers of the mass so as to establish an integrity in the entire mass for production of a unitary mat. The jets are spaced along the length of the tube 92 across the width of the conveyor and are adapted to being oscillated in the same manner as in the arrangement of Figure 2. Integration of the mass is similarly accomplished without binder and the mass is imparted a stable dimensional character of thickness somewhat less than it had before being subjected to the forces of the jets. In one sense it might be considered that the gaseous jets act as mechanical pushers which push surface portions of the mat in inter-engaging locking relation as well as to the interior of the mass to effect an inter-knitting of the surface and interior portions of the mass.

A variety of fibers and fiber mixtures may be formed into an inter-knitted self-integrated mat product according to the principles of the presently described process. Beside fibers of glass, fibers of rayon, alginate fibers, superpolyamide fibers, polyvinyl fibers, polyvinylidene fibers, acrylonitrile fibers, protein fibers, or mineral fibers such as rock fibers and the like can be so treated.

Figure 5 illustrates another embodiment of the present invention in which a mat 101 is already formed and supplied from a roll 100 and is passed over a conveyor 105 of foraminous-type having configurated apertures 111 therein. The conveyor belt 105 is supported on rotatable rolls 109 and 110 and is associated with overlying rollers 103 and 104 under which the mat 101 is drawn and subsequently rolled into a roll-type package 106. The fibrous mat 101 is bonded together and has an integrity of its own already established without need for being subjected to further forces of gaseous jets, but the mat is passed under a jet source such as a tubular blower 102 from which jets of gas are blasted against the surface of the mat to cause an embossment thereof by reason of depressions having been formed in the mat within the apertures 111 of the conveyor 105. In a sense, the mat is thus caused to take on the appearance of a series of configurated pock marks or pockets in its upper surface as well as configurated embossments on the opposite side. In addition to subjecting the mat to the forces of the jets from the source 102, a suction box 108 is provided under the conveyor to aid the jet source in imparting the depressions and embossments in the surface of the mat. The action of the suction chamber, in addition establishes a more intimate contact of the mat with the conveying belt and results in the mat being carried forwardly more positively. The forward motion of the mat may be effected by synchronizing the roll-up by way of driving the roll 106 and the conveyor belt 105 by suitable conventional means not shown.

Thus, the principles of the present invention can be utilized to impart decorative effects to the mats already formed as well as to permit production of a binderless mat. Additionally, it is to be understood that the principles are applicable to production of a binderless mat of decorative character in that a mat may be produced as described above having configurated depressions and corresponding embossments impressed therein directly in the mat integration process. This is accomplished merely by providing configurations in the foraminous conveyor in the zone in which the binderless mat is formed by gaseous jets.

Figure 6 illustrates another conveyor which has star shaped apertures therein so that depressions and embossments can be imparted to fibrous mats. It will be apparent from the foregoing that a wide variety of decorative configurations can be imparted to mats subjected to the forces of jets according to the present invention.

Figure 7:
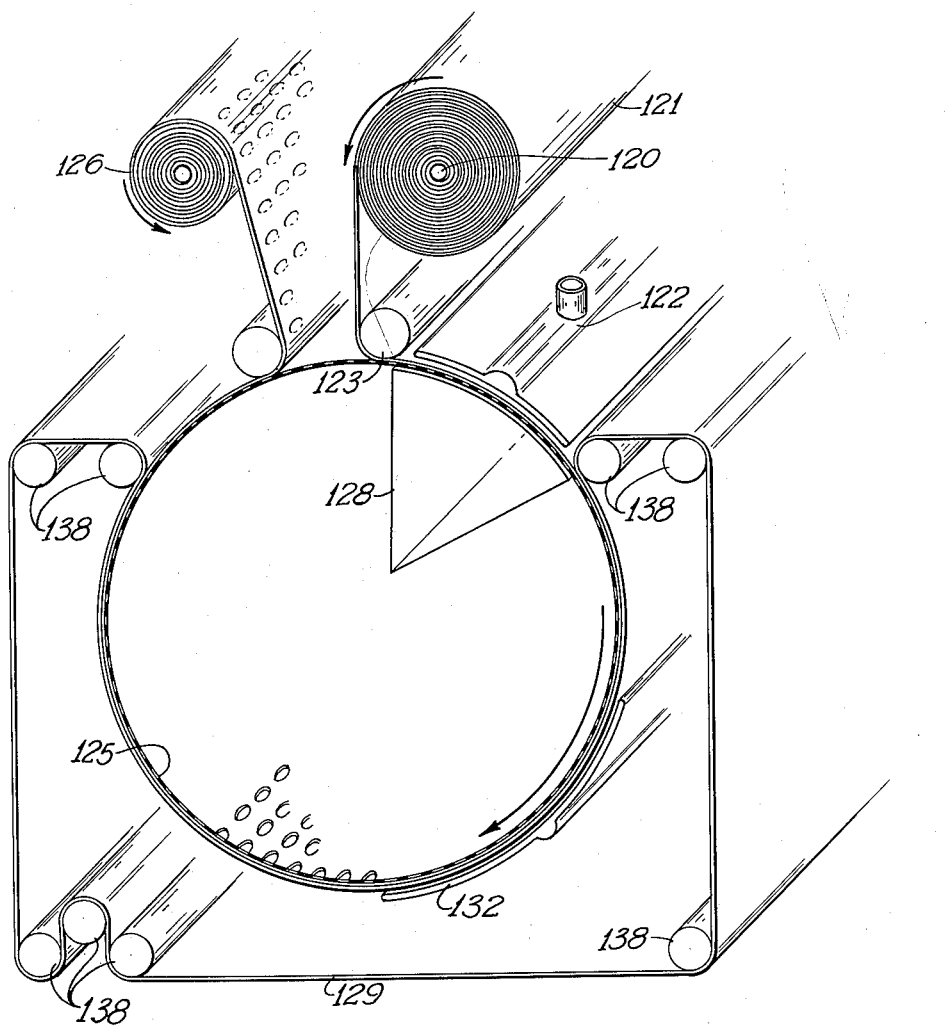
Figure 7 is a side elevational view of another arrangement of apparatus for treatment of mats according to the present invention.

Figure 7 illustrates still another arrangement whereby decorative impressions may be imparted to mats already formed. In this arrangement the decorative patterning of the mat is effected by provision of the desired configurated apertures in a drum. A bonded fibrous mat 121 is fed from a supply roll 120 over a feed roll 123 and is held against the apertured surface of a rotating drum 125. Air, steam or other gas is driven through the mat and surface of the drum 125 under the action of forces provided by a suction chamber 128 disposed in the interior of the drum 125 below the area within which the forces of one or more gaseous blowers 122 are operating. An endless belt may be arranged to make contact with the mat and to hold the mat against the surface of the drum throughout the remainder of its distance of contact about the circumference of the drum 125 until the mat is rewound. This is accomplished by looping the endless belt 129 over a series of rolls 138 arranged to hold the fabric snugly against the surface of the drum and to move in synchronism with the surface of the drum as it rotates. The bonded mat 121 is introduced in between the endless fabric 129 and the drum surface and moves forwardly over the drum surface until rewound into a shipping package 126. If the gas driven against the mass of fibers is moist, however, the fabric may be passed through a zone of the drum in which it is subjected to heat for drying purposes before being rewound. The heat can be supplied from suitable means such as an electric heater unit 132 located in a forward position along the drum circumference. If the belt 129 is pervious, then a gaseous blower may be used to supply the heat for drying and a second suction zone might be located on the side opposite to the belt from that on which the blower is located to aid in the drawing of the hot gas through both the belt and drum.

The belt holding the bonded mat in contact with the drum surface may be of hardware cloth or other material having high tear strength and may have configurated apertures therein if desired to impart a desired embossed configuration to the mat being treated.

Although there has been described herein, what at present are considered preferred embodiments of the invention, various modifications of the invention will be apparent to those skilled in the art and it is my desire that the appended claims shall cover all modifications and arrangements which come within the scope and spirit of my invention.

I claim:

1. A method of processing a multiplicity of fibers in a porous fibrous mat comprising depositing a layer of said fibers on a foraminous surface, and directing concentrated gaseous blasts against said layer, said gaseous blasts being of sufficient pressure to penetrate said layer to said foraminous surface and interlock said fibers for self integration of said layer.

2. A method of processing a multiplicity of glass fibers in a porous fibrous mass comprising depositing a layer of said fibers on a foraminous surface, and directing a plurality of concentrated gaseous blasts against said layer, said gaseous blasts being of sufficient pressure against said layer that it forcefully penetrates the layer to said foraminous surface and effects an interlocking integration of the fibers in said layer, progressively advancing said layer under said blasts and reciprocating said gaseous blasts across said layer to subject the entire layer to the fiber-interlocking forces of said blasts.

3. A method for producing a porous sheet material comprising the steps of forming a multiplicity of fibers, accumulating said fibers as a mass, distributing said mass of fibers as a layer of fibers, and subjecting said layer of fibers to a self integrating process consisting of direct application to a major surface of the layer gaseous jet forces of magnitude sufficient to interentangle the mass of fibers in said layer into self-interlocking integrated relationship.

4. A continuous method for producing a porous sheet material comprising the steps of forming a multiplicity of fibers, accumulating a portion of said fibers as a first layer, subjecting said layer of fibers to an integration process consisting of direct application to a major surface of the layer the forces of gaseous jets sufficient to interentangle the fibers of said layer in self-interlocking integrated relationship, accumulating another portion of said fibers as a second layer over said first layer, subjecting said second layer of fibers to a process of integration consisting of direct application to a major surface of the second layer the forces of gaseous jets sufficient to interentangle the fibers of said second layer in self-interlocking integrated relationship within itself as well as in interlocked integrated relationship with the fibers of said first layer of fibers.

5. A method for producing a binderless mat comprising collecting at least one continuous strand of fibers into a fibrous accumulation, distributing said accumulation as a layer of overlapping strand loops, swirls and folds and directing concentrated gaseous blasts in direct impinging and penetrating relationship against said layer to reorient said strand loops, swirls and folds into interlocked self-integrated relation as a mat.

6. A method for producing a binderless mat comprising collecting strands of fibers as a first layer of overlapping strand loops, swirls and folds; directing concentrated gaseous blasts against said layer to reorient said strand loops, swirls and folds in interlocked self-integrated relation; depositing a second layer of strands of fibers in the form of loops, swirls and folds over said first layer; then directing concentrated gaseous blasts against said second layer of such magnitude that the strand loops, swirls and folds therein become reoriented in interlocking self-integrated relationship between themselves as well as with fibers of said first layer.

7. Apparatus for forming and processing a binderless porous mat of fibers comprising means for producing fibers from heat softened material, a foraminous fiber-collecting surface disposed to receive the fibers in a relatively thin layer, gaseous blower means arranged to extend across the width of said layer, said gaseous blower means having means associated therewith for directing blasts of gas under pressure against said surface with sufficient force to cause an interlocking of fibers in said layer into self integrated relation, and means for continuously advancing said layer on said fiber-collecting surface under said blower means whereby an entire surface of said layer is subjected to the fiber interlocking forces of the gaseous blasts of said blower means.

8. Apparatus for forming a porous mat of multiply filament glass fiber strands comprising a feeder for feeding streams of molten glass from a plurality of orifices, means for drawing said streams out into filaments, means spaced from said feeder for gathering said filaments into a strand as they are being formed, means for delivering said strand into an accumulation thereof on a collection surface, means for compressing the accumulation of said strand on said collection surface, gaseous blower means arranged to direct blasts of gas under pressure against the compressed accumulation of strand on said collection surface, means for oscillating said blower means across said compressed accumulation of strand, and means for advancing said accumulation in a direction generally transverse to the direction of oscillation of said blower means.

9. Apparatus for forming a porous mat of fibers of heat softenable mineral material comprising, a source of molten mineral material, a feeder for feeding streams of said molten material from a plurality of orifices, gaseous blower means for directing gaseous blasts against said streams to disrupt said streams into fibers, a foraminous collection surface spaced from said feeder and gaseous blast means for receipt of said fibers as a mass, second gaseous blower means arranged to direct gas under pressure against the fibers on said collection surface, means for oscillating said second gaseous blower means across said mass of fibers and means for advancing said mass of fibers in a direction generally transverse to the direction of oscillation.

10. A method for forming a binderless porous fibrous glass mat comprising attenuating streams of molten glass into continuous fibers, gathering said fibers into a continuous strand as they are being formed, collecting said strand into a distributed accumulation on a collection surface, compressing said accumulation, blasting jets of gas against the accumulation following compression to interentangle and interlock portions of the glass strand in the accumulation with each other, oscillating the jets of gas across the accumulation, and advancing the accumulation in a direction transverse to the direction of oscillation of said jets.

11. A method for forming a binderless porous fibrous glass mat comprising atenuating streams of molten glass into discontinuous fibers, collecting said fibers into a distrbuted accumulation on a collection surface, compressing tributed accumulation, blasting jets of gas against said accumulation following compression to interentangle and interlock portions of individual fibers in said accumulation with each other, oscillating the jets of gas across the accumulation, and advancing the accumulation in a direction transverse to the direction of oscillation of said jets.

References Cited in the file of this patent

UNITED STATES PATENTS

| | | |
|---|---|---|
| 1,454,049 | Genung | May 8, 1923 |
| 2,083,383 | Kennedy | June 8, 1937 |
| 2,331,146 | Slayter | Oct. 5, 1943 |
| 2,354,765 | Meyer et al. | Aug. 1, 1944 |
| 2,518,744 | Barnard | Aug. 15, 1950 |
| 2,544,019 | Heritage | Mar. 6, 1951 |
| 2,586,774 | Bastian et al. | Feb. 26, 1952 |
| 2,659,848 | Labino | Nov. 10, 1953 |
| 2,717,416 | Fletcher | Sept. 13, 1955 |
| 2,736,676 | Frickert | Feb. 28, 1956 |
| 2,774,129 | Secrist | Dec. 18, 1956 |
| 2,787,542 | Labino | Apr. 2, 1957 |
| 2,814,162 | Toulmin | Nov. 26, 1957 |
| 2,859,506 | Slayter | Nov. 11, 1958 |